United States Patent
Hörtner et al.

(10) Patent No.: US 11,383,835 B2
(45) Date of Patent: Jul. 12, 2022

(54) SYSTEM AND TRANSPORT DEVICE FOR UNMANNED AERIAL VEHICLES

(71) Applicant: ARS ELECTRONICA LINZ GMBH & CO KG, Linz (AT)

(72) Inventors: Horst Hörtner, Kleinzell (AT); Harald Dirisamer, Linz (AT)

(73) Assignee: ARS ELECTRONICA LINZ GMBH & CO KG, Linz (AT)

( * ) Notice: Subject to any disclaimer, the term of this patent is extended or adjusted under 35 U.S.C. 154(b) by 436 days.

(21) Appl. No.: 16/608,510

(22) PCT Filed: Apr. 26, 2018

(86) PCT No.: PCT/AT2018/060083
§ 371 (c)(1),
(2) Date: Oct. 25, 2019

(87) PCT Pub. No.: WO2018/195574
PCT Pub. Date: Nov. 1, 2018

(65) Prior Publication Data
US 2020/0189734 A1    Jun. 18, 2020

(30) Foreign Application Priority Data
Apr. 28, 2017    (AT) .......................... GM 50074/2017

(51) Int. Cl.
*B64C 39/02*    (2006.01)
*B60L 53/12*    (2019.01)
(Continued)

(52) U.S. Cl.
CPC ............ *B64C 39/024* (2013.01); *B60L 53/12* (2019.02); *B64F 1/007* (2013.01); *G05D 1/104* (2013.01);
(Continued)

(58) Field of Classification Search
CPC ............ B64C 39/024; B64C 2201/042; B64C 2201/066; B64C 2201/146;
(Continued)

(56) References Cited

U.S. PATENT DOCUMENTS

| | | | | |
|---|---|---|---|---|
| 2015/0183326 A1* | 7/2015 | Ryberg | ................... | B60L 53/00 320/109 |
| 2016/0364989 A1* | 12/2016 | Speasl | .................. | G08G 5/0034 |
| 2016/0376031 A1* | 12/2016 | Michalski | ............ | G05D 1/0676 701/15 |

OTHER PUBLICATIONS

International Preliminary Report on Patentability of PCT/AT2018/060083 dated Apr. 5, 2019.
(Continued)

*Primary Examiner* — Justin M Benedik
(74) *Attorney, Agent, or Firm* — Workman Nydegger

(57) ABSTRACT

A system composed of at least two unmanned aerial vehicles, each aerial vehicle comprising a drive unit, a flight control unit for controlling the trajectory of the aerial vehicle by means of the drive unit and a rechargeable power cell. Each aerial vehicle comprises an electrical first interface, and the system comprises at least one transport device with at least one chamber defined by boundary elements, in particular corner elements, for receiving the aerial vehicles stacked essentially vertically in the operating position and an electrical control and supply system for charging the power cells and/or for communicating with the flight control units via the first interfaces.

9 Claims, 3 Drawing Sheets

(51) Int. Cl.
  *B64F 1/00* (2006.01)
  *G05D 1/10* (2006.01)
(52) U.S. Cl.
  CPC .. *B64C 2201/042* (2013.01); *B64C 2201/066* (2013.01); *B64C 2201/146* (2013.01); *B64C 2201/201* (2013.01)
(58) Field of Classification Search
  CPC .... B64C 2201/201; B60L 53/12; B64F 1/007; G05D 1/104
  See application file for complete search history.

(56) References Cited

OTHER PUBLICATIONS

International Search Report and Written Opinion of PCT/AT2018/060083 dated Jun. 15, 2018.

\* cited by examiner

SYSTEM AND TRANSPORT DEVICE FOR UNMANNED AERIAL VEHICLES

The present application is a U.S. National Stage of International Application No. PCT/AT2018/060083, filed on Apr. 26, 2018, designating the United States and claiming the priority of Utility Patent Application No. GM 50074/2017 filed with the Austrian Patent Office on Apr. 28, 2017. All of the aforementioned applications are incorporated herein in their respective entireties by this reference.

The invention relates to a system composed of at least two unmanned aerial vehicles, each aerial vehicle comprising a drive unit, a flight control unit for controlling the trajectory of the aerial vehicle by means of the drive unit and a rechargeable power cell.

For the display of art or information in the entertainment industry, at public and private events and, respectively, in general, it is often desirable to provide an image in the airspace. The progress in recent years in the technical field of unmanned aerial vehicles, commonly referred to as "Unmanned Aerial Vehicle" (UAV), particularly in the field of "drones" and, respectively, "multicopters", has led to such aerial vehicles being increasingly used for providing such images in the airspace.

For example, at the public music event "Klangwolke" on Sep. 1, 2012, in Linz, Austria, 49 "quadcopters" were combined to form a dynamic swarm group for displaying dynamic images and visualizations in the airspace. Each quadcopter exhibited a light diffusion screen and an LED lamp within this screen. Thus, each quadcopter formed a "pixel" of the image in the airspace, a so-called "SPAXEL".

In future, much larger swarm groups or systems involving more than one hundred such aerial vehicles shall be used for providing an image in the airspace. In order for this to be technically and economically feasible, problems and challenges, which as yet are still unresolved, will have to be solved for this purpose, especially with regard to logistics and the control of large swarm groups. The applicant is not aware of any solutions in that respect, particularly with regard to logistics and reliability in a plurality of unmanned aerial vehicles.

The document US 2016/364989 A1 shows a system for controlling UAVs and for storing the UAVs in a transport device with a chamber defined by boundary elements. The transport device may comprise a control and supply system for charging the batteries, for example via a plug, a nozzle or wirelessly by inductive charging.

US 2015/183326 A1 shows a transport device with boundary elements and UAVs stackable therein which can be charged in the transport device by means of a control and supply system.

The invention is based on the object of providing a system which enables improved logistics and, where appropriate, enhanced reliability of a plurality of aerial vehicles.

According to the invention, this object is achieved by the features of claim 1.

By means of the system according to the invention, a transport of aerial vehicles as space-saving and, consequently, as simple as possible is advantageously permitted. The power cells of the aerial vehicles can be charged during transport and/or storage in the transport device, and the control and supply system is able to address the aerial vehicles, for example, in order to query their technical readiness, in particular the functional capability before they start, or other technical parameters. Thus, the probability of failure of an aerial vehicle is advantageously reduced, and, as a result, the reliability of the system is increased.

By means of the system according to the invention, in particular the transport device according to the invention, a transport of aerial vehicles as space-saving and, consequently, as simple as possible is advantageously permitted. The power cells of the aerial vehicles can be charged during transport and/or storage in the transport device, and the control and supply system is able to address the aerial vehicles, for example, in order to query their technical readiness, in particular the functional capability before they start, or other technical parameters. Thus, the probability of failure of an aerial vehicle is advantageously reduced, and, as a result, the reliability of the system is increased.

In connection with the swarm control unit, each swarm control unit is designed as a core module, wherein the aerial vehicles are designed by means of the core modules so as to be mechanically stackable along a stacking axis which is essentially vertical in the operating position and wherein each core module comprises the flight control unit, the power cell, the first interface located at a lower side of the core module, and an electrical third interface which is located at an upper side of the core module opposite to the lower side along the stacking axis and is designed for electrical connection with the first interface of an aerial vehicle stacked on top of it, wherein, in a stacked and connected state of the aerial vehicles, the control and supply system is designed for charging the power cells and/or for communication with the core modules via the first and third interfaces. As a result, the aerial vehicles can be stacked in a very simple and compact manner, especially without any further (auxiliary) means, wherein the contact between the aerial vehicles or, respectively, between the aerial vehicles and the control and supply system is optionally established automatically and continuously, while the aerial vehicles are in a stacked state.

In an advantageous embodiment, the control and supply system of the transport device is designed for contactless communication, preferably by means of electromagnetic induction, with the first interfaces of the aerial vehicles. Thus, the charging of the power cells and the communication with the aerial vehicles may advantageously occur in a contactless manner, preferably simultaneously by using the same technology.

In an alternative advantageous embodiment, the control and supply system of the transport device is designed for contact-bound communication, in particular by means of sliding contacts between at least one of the boundary elements of the chamber and the first interfaces of the aerial vehicles, with the first interfaces of the aerial vehicles. This enables a communication as free from interference and radiation as possible. While the aerial vehicle is located in the chamber, the contact between the aerial vehicle and the transport device is established automatically and constantly according to the example of the sliding contact.

Suitably, the control and supply system of the transport device is integrated into a ground unit of the transport device, wherein the chamber is arranged above the ground unit in the operating position and the control and supply system is designed so as to be connectable to the first interface of the respective aerial vehicle stacked lowermost. As a result, on the one hand, the transport device is optimized in terms of compactness and/or, in a broader sense, with respect to the form factor. On the other hand, in case the swarm control units are designed as core modules, a very simple and fast stacking of aerial vehicles can be achieved, wherein the contact is optionally established automatically as soon as the aerial vehicle is stacked on the ground unit or, respectively, on an aerial vehicle already stacked and held in the chamber.

Advantageously, the transport device is furthermore designed for starting and landing the aerial vehicles, wherein the chamber is open on a side of the transport device which is the top side in the operating position and wherein the control and supply system of the transport device is designed for transmitting and/or changing starting and/or landing sequence information and/or positional information to all/of all flight control units of the aerial vehicles connected to the control and supply system. As a result, the aerial vehicles can advantageously start directly from the transport device and can optionally also land back in/on it, wherein aerial vehicles can be steered directly from the transport device to a desired position in the airspace at a desired point in time on the basis of starting sequence information, positional information and landing sequence information, and vice versa.

Suitably, the transport device comprises a lifting means, which preferably is movable essentially vertically, which lifting means is designed for raising the respective aerial vehicle stacked uppermost in the chamber for the starting process at least partially above the boundary elements of the chamber, with the control and supply system being designed for controlling the lifting means. Starting an aerial vehicle is thus facilitated, and the risk of accident associated therewith is reduced.

Suitably, the lifting means comprises a tilting mechanism or a wiping means, wherein the tilting mechanism or the wiping means is designed for removing an inoperable aerial vehicle from the aerial vehicle located underneath or from the lifting means, with the control and supply system being designed for controlling the tilting mechanism or the wiping means and for changing the starting and/or landing sequence information and/or the positional information to all/of all aerial vehicles connected to the control and supply system. If the control and supply system determines that an aerial vehicle to be started is inoperable, said aerial vehicle can be removed from the lifting means in an automated fashion, and the next operational aerial vehicle will replace it, with the control and supply system optionally changing the starting and/or landing sequence information and/or the positional information accordingly.

Suitably, the transport device or the lifting means comprises a starting mechanism, in particular a catapult starting mechanism, wherein the starting mechanism is designed for mechanically bringing, in particular catapulting, an aerial vehicle to be started into a starting position in the airspace above the transport device, with the control and supply system being designed for controlling the starting mechanism. If, for example, there is no additional lifting means, each aerial vehicle to be started can advantageously be brought, in particular catapulted, directly from the chamber into the airspace and subsequently can go to its position in the airspace. If an additional lifting means is present, the aerial vehicle to be started can be brought, in particular catapulted, from the lifting means into the airspace. Starting an aerial vehicle is thus facilitated, and the risk of accident associated therewith is reduced.

In a further embodiment, the system comprises at least two, preferably a plurality of, transport devices and a system swarm control unit for controlling a plurality of unmanned aerial vehicles in a swarm, with the system swarm control unit being designed for communicating with the control and supply system of the individual transport devices and/or for communicating with the individual aerial vehicles via their swarm control units or via communication means of the aerial vehicles. As a result, a plurality of aerial vehicles, in particular several hundred aerial vehicles, can advantageously be started by means of the system swarm control unit, optionally directly from the respective transport device, and/or can be controlled and/or landed in the airspace, optionally directly in/on the respective transport device.

Advantageously, in a transport device according to the invention, the height of the chamber is designed so as to be adaptable to the number of received aerial vehicles, in particular in sections, by vertically stacking uniform boundary elements with specified dimensions. In this way, the flexibility and/or the modularity of the system according to the invention is/are improved.

Advantageously, the transport device comprises landing means for easier landing of the aerial vehicles to be received in the chamber. The landing of an aerial vehicle is thus facilitated, and the risk of accident associated therewith is reduced.

Suitably, the transport device comprises, on its upper side, preferably controllable fixing means for fastening the aerial vehicles received in the chamber. The transport of the aerial vehicles is thus improved, and the risk of damage during transport associated therewith is reduced. Optionally, the control and supply system is designed for controlling, in particular releasing, the fixing means.

Suitably, the aerial vehicles are formed by commercially available aerial vehicles produced for single flight, in particular by multicopters. As a result, the system can be purchased at low cost, can optionally be expanded and can be adjusted for swarm flight particularly easily. Each transport device according to the invention, in particular the shape and the size of the chamber, is adapted or adaptable to the aerial vehicles accordingly.

Furthermore, the system, particularly if comprising a plurality of transport devices and aerial vehicles, can suitably comprise a base platform for supporting the transport devices, with a fixed positional reference being configured between the control and supply system of the transport devices on the base platform and the system swarm control unit. Thus, the logistics and controllability of a large plurality, for example several hundred, of aerial vehicles is advantageously rendered possible, and the risk of error, in particular with regard to starting, landing sequence and positional information, is reduced.

In the following, the system according to the invention and the transport device according to the invention are explained in further detail in a non-limiting way, on the basis of exemplary embodiments illustrated in the drawings.

Figure 1:
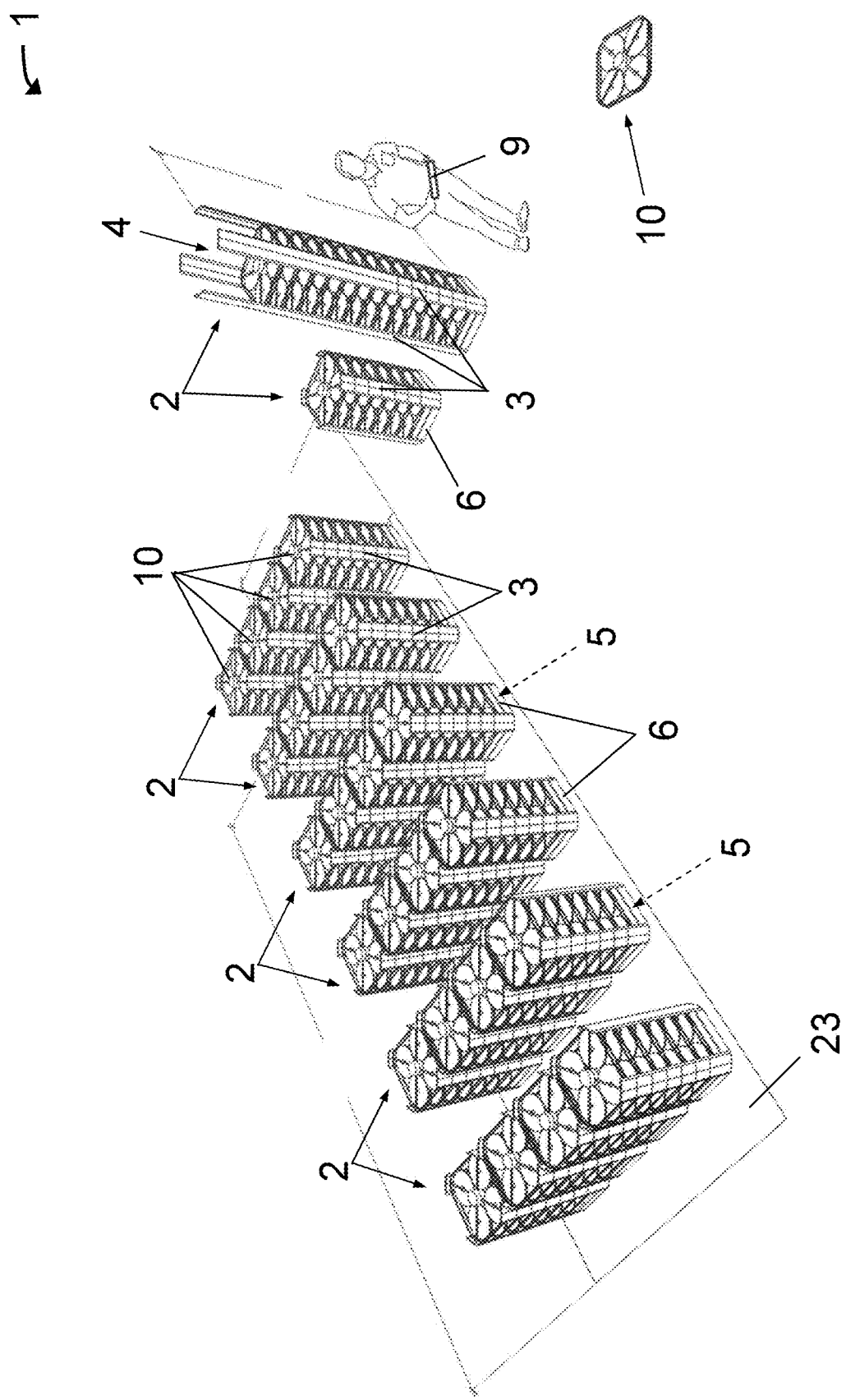
FIG. 1 shows a system according to a first embodiment of the invention in a perspective view from above, with the system comprising a plurality of transport devices and unmanned aerial vehicles.

In the following description, the term "airspace" refers to any possible space above an artificial or natural ground inside or outside an artificial or natural space or, respectively, building.

In the following description, the term "swarm intelligence" refers to specific advantages of swarm group flight, in particular the collective movement of several individuals within the swarm based on the movement of a few and/or the permanent adjustment of the distances between the individuals mutually dependent on the closest neighbouring individuals, wherein, in the present invention, the individuals are configured as unmanned aerial vehicles. "Swarm flight" in this context denotes the ability of the system to move those aerial vehicles through a common airspace in an automated fashion, with as little technical effort as possible and, if possible, without collision.

In the following description, the term "in the operating position" refers to the orientation in the three-dimensional space intended for the operation according to the invention of the respective device or of the respective object. This means, for example, that an object oriented "essentially vertically", which is located on solid ground in its operating position, is essentially aligned with the solder. In this regard, "essentially" expresses a normal deviation to be tolerated within a corresponding tolerance interval. Subsequently, in the example of "essentially vertical", an alignment according to the solder with a tolerable deviation of preferably less than twenty angle degrees, particularly preferably less than ten angle degrees, is to be considered in comparison to the solder.

In the following description, equal reference numerals are used for identical or essentially identical embodiments, and only features which are unique in their technical function or effect in terms of this exemplary description are provided with their own reference numerals.

FIG. 1 schematically shows a system 1 according to a first embodiment of the invention, comprising a plurality of, more specifically twenty-six (26), transport devices 2 and a plurality of, more specifically one hundred and ninety (190), unmanned aerial vehicles 10. Consequently, each transport device 2 transports, or, respectively, stores, seven aerial vehicles 10, with one transport device 2 transporting precisely fourteen aerial vehicles 10. In the operating position, this transport device 2 has thus been expanded with regard to its height for transporting, or, respectively, storing, a larger number of aerial vehicles 10. The system 1 according to the invention is applicable to any number of unmanned aerial vehicles 10 and/or transport devices 2.

Each transport device 2 comprises a chamber 4 defined by boundary elements 3, which are designed as corner elements in the present first embodiment of the system 1, for receiving the aerial vehicles 10 which are stacked essentially vertically in the operating position. Furthermore, each transport device 2 has an electrical control and supply system 5, which is integrated into a ground unit 6 of the transport devices 2. In the operating position, the chamber 4 is arranged above the ground unit 6.

The height of the chamber 4 is optionally adaptable to the number of received aerial vehicles 10 by vertically stacking the boundary elements 3. The height of the chamber 4 can be adaptable by specified dimensions of the boundary elements 3, for example, in sections. In FIG. 1, this is shown for the transport device 2 arranged farthest to the right, which is otherwise completely identical to the other transport devices 2, as all essential technical and functional features are situated in the ground unit 6.

Alternatively, the control and supply system 5 may be attached, for example, to the transport device 2 or integrated into the boundary elements 3. The control and supply system 5 could also be integrated into a cover unit or be designed as a separate unit independently of the transport device 2.

Figure 2:
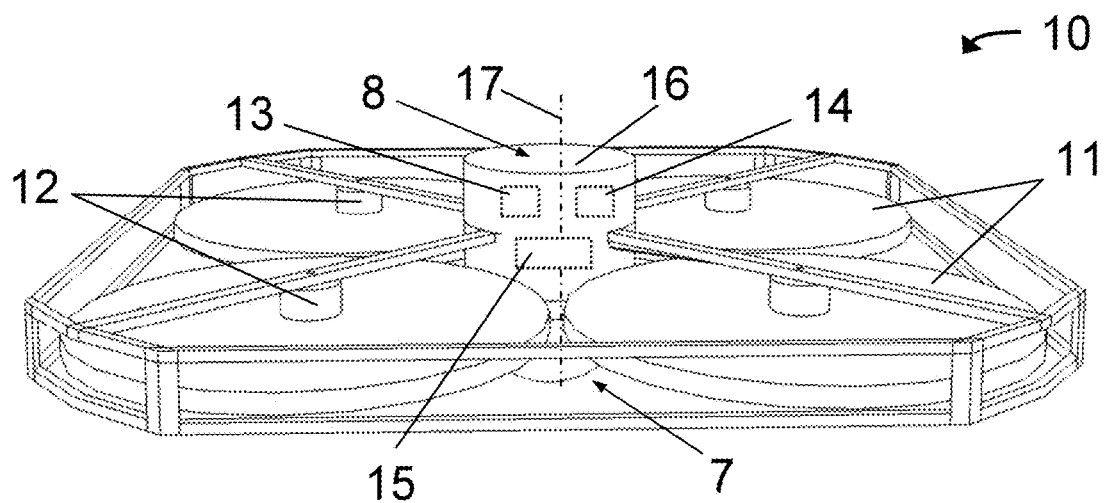
FIG. 2 shows a stackable unmanned aerial vehicle with a core module according to FIG. 1 in a perspective view from above.

FIG. 2 shows, in a schematic design, an example of an unmanned aerial vehicle 10 for use in the system 1. In this case, the aerial vehicle 10 is designed as a drone manufactured for single flight, which is more precisely referred to as a so-called "quadcopter". In this regard, a drive unit of the aerial vehicle 10 is composed of four rotor units 11, which are driven by four electric motors 12. The drive unit enables the flight of the aerial vehicle 10 in the airspace.

A "quadcopter" is a variant of a "multicopter". The aerial vehicle 10 may alternatively be designed as another variant of a multicopter, e.g., as a commercially available "octocopter" with eight rotor units, etc., wherein essentially any number of rotor units is possible. However, the unmanned aerial vehicle 10 can also be any aerial vehicle that can be stabilized in its position in the airspace (such as a zeppelin, a balloon, etc.).

Furthermore, the aerial vehicle 10 comprises an electrical first interface 7 and a flight control unit 13, which is designed for controlling the trajectory of the aerial vehicle 10 by means of the drive unit. The flight control unit 13 is designed for targeting positions of the aerial vehicle 10 in the airspace indicated by positional information in order to control the trajectory of the aerial vehicle 10. The positional information is stored in a memory unit 14 of the flight control unit 13 or in a separate memory unit 14. With the flight control unit 13, it is thus possible to steer the aerial vehicle 10 at a certain airspeed to a certain position in the airspace or along a certain trajectory in the airspace.

Alternatively, the flight control unit 13 receives the control information exclusively or additionally from a radio remote control (not shown). The radio remote control may be a commercially available radio remote control that has been sold together with the aerial vehicle 10. Alternatively, a commercially available computer, a laptop computer, a tablet computer, a smartphone, etc. can also be used.

The positional information consists, for example, in "Global Positioning System (GPS)"-based, three-dimensional coordinates in the airspace, i.e., for example, data in GPS Exchange Format (GPX). The data in GPX format may include geodata, i.e., the geographic coordinates latitude, longitude and altitude. In this regard, the aerial vehicle 10 optionally furthermore comprises a GPS receiver. Alternatively, the data may also be based on the Galileo, GLONASS, Beidou/Compass or any other satellite navigation and/or timing system, or on a local or building-based navigation system for positioning the aerial vehicle 10 inside and outside of buildings (e.g., positioning by transmitting transmission signals, optical positioning systems, etc.). The trajectory of the aerial vehicle 10 corresponds to a chronological sequence of positions, which also may be data in GPX format. The extent of the chronological sequence determines the airspeed of the aerial vehicle 10.

Furthermore, the aerial vehicle 10 has a rechargeable power cell 15. The first interface 7 is connectable to the electrical control and supply system 5, with the electrical control and supply system 5 being designed for charging the power cell 15 and/or for communicating with the flight control unit 13 via the first interface 7.

The control and supply system 5 of one or each transport device 2 can be designed for contact-bound communication with the first interfaces 7 of the aerial vehicles 10. In the system 1 according to the first embodiment of the invention as illustrated in FIG. 1, each aerial vehicle 10 according to FIG. 2 comprises a modular swarm control unit 16 in a first design. This swarm control unit 16 is designed as a core module for contact-bound communication, wherein the aerial vehicles 10 are designed so as to be mechanically stackable along a stacking axis 17, which is essentially vertical in the operating position, by means of the core modules.

Each core module comprises the flight control unit 13, the power cell 15, optionally the memory unit 14, the first interface 7 located at a lower side of the core module, and an electrical third interface 8. The third interface 8 is located at an upper side of the core module, which is opposite to the lower side along the stacking axis 17, and is designed for being electrically connected to the first interface 7 of an aerial vehicle 10 stacked above it. An electrical second interface 20, via which the swarm control unit 16 is designed for contactless control of the flight control unit 13 and/or for charging the power cell 15, is only optionally necessary in this case, since the connections necessary for this purpose can also be formed internally in the core module. The second interface 20 is particularly useful when commercially available aerial vehicles 10 already having an interface to the flight control unit 13 are used. Then, the swarm control unit 16 can be coupled directly to an interface to the flight control unit 13 according to a standard of the following protocols: Micro Air Vehicle Communication Protocol; CAN Bus Protocol.

Figure 3:
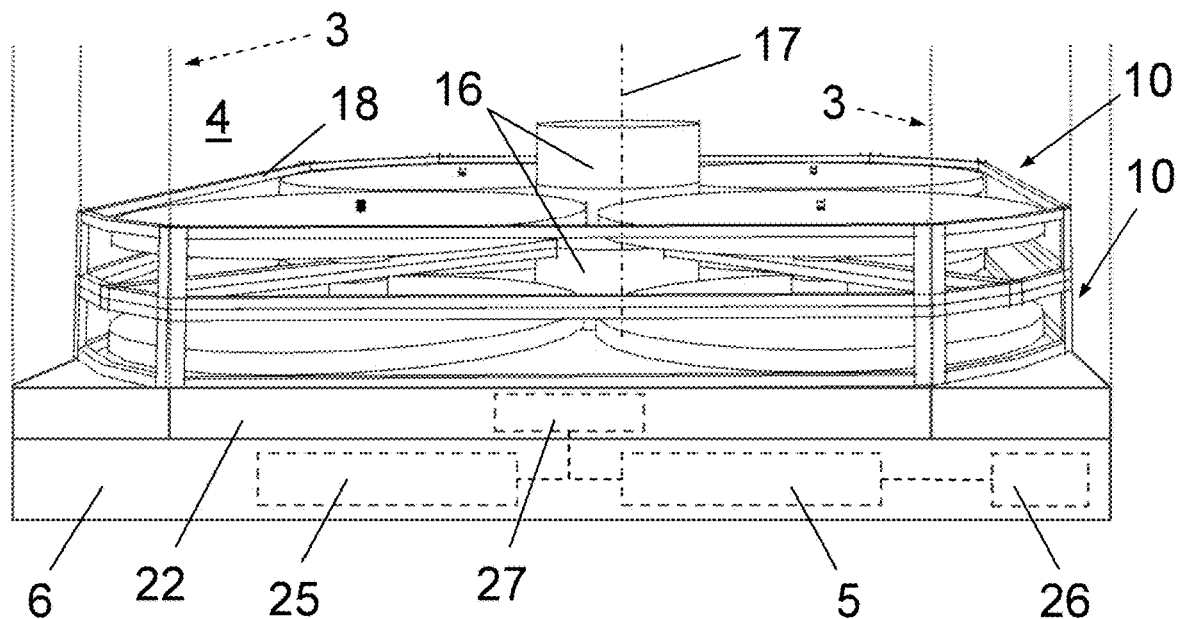
FIG. 3 shows two stacked aerial vehicles according to FIG. 1 in a perspective view, which have been received in a transport device.

In the stacked and connected state of the aerial vehicles 10, the control and supply system 5 is designed for charging the power cells 15 and/or for communication with the core modules via the first interfaces 7 and the third interfaces 8. Such a situation is schematically illustrated in FIG. 3, wherein two aerial vehicles 10 are stacked on the ground unit 6 of a transport device 2 in the chamber 4 thereof and are connected to the control and supply system 5 of the transport device 2 by means of the first interfaces 7 and the third interfaces 8. In the operating position, the control and supply system 5 is thus connected to the first interface 7 of the aerial vehicle 10 stacked lowermost, and any aerial vehicle 10 stacked above it is connected, via its first interface 7, to the third interface 8 of the aerial vehicle 10 positioned underneath. The transport device 2, in particular the ground unit 6, may comprise an additional energy source 25, for example a high-capacity power cell.

Figure 4:
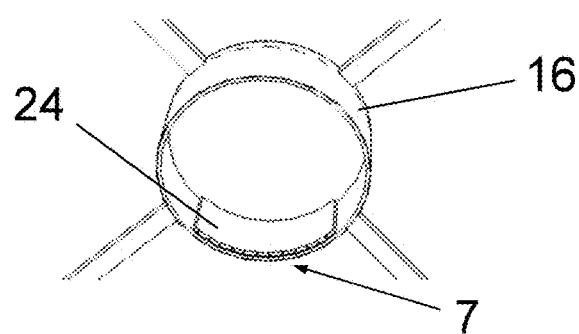
FIG. 4 shows the core module of an unmanned aerial vehicle according to FIG. 1 in a perspective view from below.

In the present example of the core modules, one of which is shown in more detail in FIG. 4, this contact-based communication via the first interfaces 7 and the third interfaces 8 can be configured as a continuous system bus 24, which, if the aerial vehicles 10 are stacked mechanically, is produced automatically, for example via flexible spring contact pins. Optionally, a force-transmitting connection can additionally be produced, for example, via a bayonet lock, via a mechanical lock, or by magnetic force. This connection can be opened or closed in an automated fashion by means of the control and supply system 5.

Alternatively, the contact-based communication could be established, for example, by means of sliding contacts between at least one of the boundary elements 3 of the chamber 4 and the first interfaces 7 of the aerial vehicles 10, which first interfaces 7 would then be located, for example, on a frame 18 of the aerial vehicles 10. The boundary elements 3, i.e., the corner elements, of the transport device 2 are indicated in FIG. 3 by dashed lines.

Figure 5:
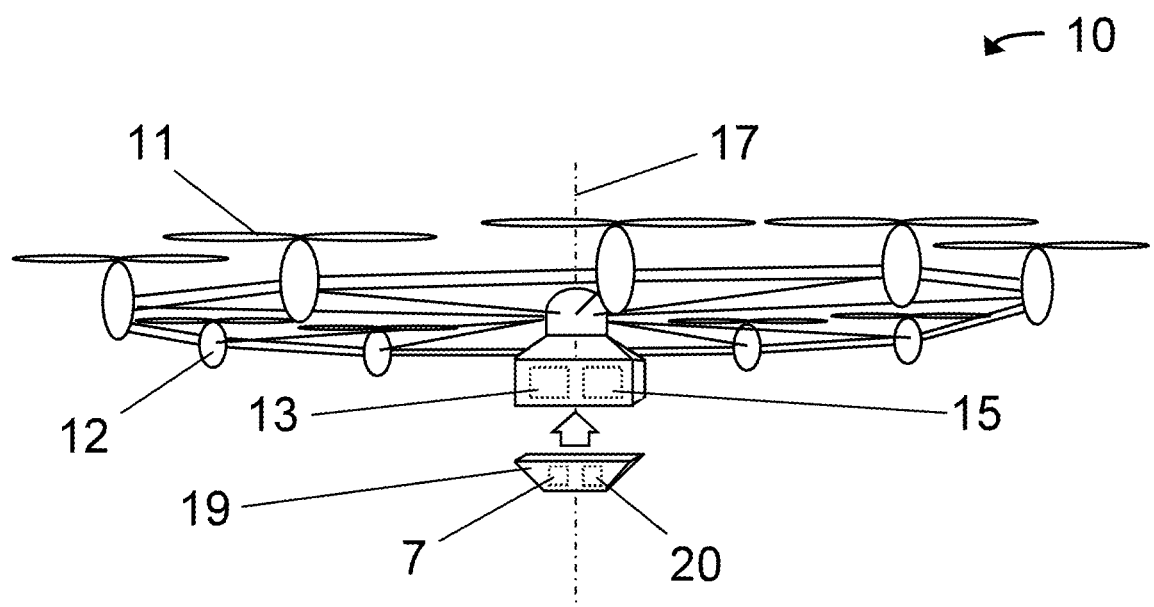
FIG. 5 shows an unmanned aerial vehicle according to a further embodiment.

Alternatively, the control and supply system 5 is designed for contactless communication with the first interfaces 7 of the aerial vehicles 10. In a second design, a swarm control unit, in particular a modular swarm control unit 19, can be designed in this regard for contactless communication. The swarm control unit 19 comprises the first interface 7 and the second interface 20. The swarm control unit 19 is designed for contactless control of the flight control unit 13 and/or for charging the power cell 15 via the second interface 20. Such a swarm control unit 19 which is accommodated in a housing so as to be protected from the weather is illustrated in FIG. 5. The modular swarm control unit 19 according to the invention can be coupled to a commercially available aerial vehicle 10 produced for single flight, in the present example to a commercially available octocopter. For this purpose, the modular swarm control unit 19 is designed so as to be attachable to the aerial vehicle 10 along the arrow shown in FIG. 5 and, where appropriate, also to be removable therefrom. This can be feasible by means of any type of detachable or non-detachable fastening, for example by a plug-in, adhesive or threaded connection. Alternatively, the swarm control unit 19 can be introduced into a one-piece housing of the aerial vehicle 10, where it is accessible, for example, via a cover. The radio receiver of the flight control unit 13 can be used as a radio receiver for the control information sent by transmission means of the swarm control unit 19.

Alternatively, the swarm control unit 19 can be coupled to the aerial vehicle 10 in a contact-bound or, respectively, wired manner. For this purpose, for example, the radio receiver of a commercially available aerial vehicle 10 is unplugged and optionally removed and, instead of the radio receiver, the swarm control unit 19 is plugged into the connector. The swarm control unit 19 now comprises signal generating means for generating control information, whereby the swarm control unit 19 controls the flight control unit 13 of the aerial vehicle 10 via the second interface 20. In this case, the second interface 20 can be realized according to a standard of the following protocols: Micro Air Vehicle Communication Protocol; CAN Bus Protocol. This is reasonable especially if the commercially available aerial vehicles 10 already have such an interface to the flight control unit 13. Alternatively, the first interface 7 may also be designed as a contact-bound interface essentially in accordance with the explanations given above, with the control and supply system 5 being designed for contact-bound charging and/or for contact-bound communication with the first interfaces 7 of the modular swarm control units 19.

If the aerial vehicles 10 comprise a swarm control unit 16 or 19, the trajectories of those aerial vehicles 10 are followed on the basis of the corresponding control information which the flight control units 13 receive from the swarm control units 16 or 19. In doing so, the control information comes directly from the swarm control units 16 or 19 and either is transmitted via a protocol, or the control information of a radio remote control manually controlled by a user is simulated. For example, an aerial vehicle 10 moved to the "right" by the radio remote control is moved to the right by the swarm control unit 16 or 19 until the swarm control unit 16 or 19 notices that the target position is reached and the swarm control unit 16 or 19 switches to "hold position", with the flight control unit 13 controlling the drive unit according to the specifications of the swarm control unit 16 or 19.

Optionally, the aerial vehicles 10 can also communicate with each other by means of the swarm control units 16 or 19. As a result, the aerial vehicles 10 can be moved on the basis of the swarm intelligence as described above, for example, with the aid of distance sensors attached to the swarm control units 16 or 19. The transport devices 2 may also have additional communication means 26 for communicating with the swarm control units 16 or 19 and/or with the transport devices 2 amongst one another.

According to the above description, the aerial vehicles 10 of the system 1 can be moved in a swarm group by means of the swarm control units 16 or 19 according to the invention.

According to the explanations given so far, in the system 1 according to the invention, the communication between the first interfaces 7 of the aerial vehicles 10 and the control and supply system 5 of the transport devices 2 is "rudimentary". This is limited primarily to the fact that the control and supply system 5 addresses the aerial vehicles 10 or, respectively, the swarm control unit 16 or 19 so as to query their technical readiness, for example, the functional capability, or other technical parameters, such as the state of charge of the power cell 15.

According to the first embodiment shown in FIG. 1, the system 1 according to the invention can additionally provide a fully automated starting, optionally a subsequent positioning in the airspace, for example, based on positional information of an image to be displayed, and optionally a subsequent landing of the aerial vehicles 10. For this purpose, the transport devices 2 according to the invention are designed for starting and landing the aerial vehicles 10, with the chamber 4 being open on an upper side of the transport device 2 in the operating position. The control and supply system 5 is, in each case, designed for transmitting and/or changing starting and/or landing sequence information and/or positional information to all/of all flight control units 13 or, respectively, to all/of all swarm control units 16 or 19 of the aerial vehicles 10 connected to the control and supply system 5.

In the event that the aerial vehicles 10 have no swarm control unit 16 or 19, the control and supply system 5 transmits the starting and/or landing sequence information and/or the positional information to the flight control units 13 or, respectively, the memory units 14 of the aerial vehicles 10. In the event that the aerial vehicles 10 have a swarm control unit 16 or 19, the control and supply system 5 transmits the starting and/or landing sequence information and/or the positional information to the swarm control units 16 or 19. The aerial vehicle 10 then starts, flies and lands in a fully automated fashion based on this information. By ranking the individual aerial vehicles 10 based on the starting and/or landing sequence information, the positions and/or trajectories of the individual aerial vehicles 10 in the swarm group and/or in the image in the airspace can thus be optimized in terms of distance and speed.

This means, for example, that an aerial vehicle 10 which has to fly to a position in the airspace which is more remote from a starting area than the positions of another aerial vehicle 10 stored in the same or in another transport device 2 gets assigned a preferred starting position in the starting sequence and, optionally, also a preferred landing position in the landing sequence so that all aerial vehicles 10 will reach their positions in the airspace as equally as possible. In the event that both aerial vehicles 10 are located in the same transport device 2, this means, for example, that the aerial vehicle 10 stacked uppermost in the operating position gets assigned the positional information for the most remote position in the airspace, the aerial vehicle 10 subsequently stacked above gets assigned the second most remote position, etc. In the event that the two aerial vehicles 10 are located in different transport devices 2, this means that the aerial vehicle 10 with the positional information for the most remote position is cleared for take-off first, the aerial vehicle 10 with the positional information for the second most remote position is cleared for take-off next, etc. In the second case, the control and supply systems 5 of the different transport devices 2 must communicate with each other.

The system 1 according to the first design, which is illustrated in FIG. 1, furthermore comprises a system swarm control unit 9, wherein the system swarm control unit 9 is designed for communicating with the control and supply systems 5, optionally via the communication means 26, of the individual transport devices 2 and/or for communicating with the individual aerial vehicles 10 via the swarm control units 15 or 19 thereof or via communication means (not shown) of the aerial vehicles 10. The system swarm control unit 9 is a commercially available laptop computer, but alternatively may also be a commercially available computer, a tablet computer, a smartphone, etc.

Furthermore, the system 1 comprises a base platform 23 for supporting the transport devices 2. Thus, fixed positional references are formed between the control and supply systems 5 of the transport devices 2 on the base platform 23 amongst one another and between the control and supply systems 5 and the system swarm control unit 9, whereby the reliability of the system 1 can be improved further.

Optionally, the system swarm control unit 9 may replace the control and supply systems 5 of all transport devices 2.

Starting and/or following the trajectory and/or landing of all aerial vehicles 10 is then performed in accordance with the above description, with all information received by the control and supply systems 5 of the transport devices 2 and/or the flight control units 13 and/or the swarm control unit 16 or 19 coming from the system swarm control unit 9. In this way, a large number of commercially available aerial vehicles 10 can, for example, be started fully automatically by only one person directly from transport devices 2 according to the invention, optionally can be moved in a swarm group and optionally can be landed back in/on the transport devices 2, with the starting sequence and/or the individual trajectories and/or the landing sequence of the aerial vehicles 10 being optimized with respect to the swarm flight and/or an image in the airspace.

Optionally, each transport device 2 may comprise a lifting means 22, which preferably is movable essentially vertically in the operating position, for raising the aerial vehicles 10 received in the chamber 4 of the transport device 2. In one possible embodiment, the lifting means 22 is integrated into the ground unit 6 and is controlled by the control and supply system 5 and/or the system swarm control unit 9. In this case, the lifting means 22 forms the bottom of the ground unit 6 on which the stacked aerial vehicles 10 are supported, and this bottom can be moved up or down essentially vertically like an elevator platform by means of a drive 27. Accordingly, the movable bottom raises or lowers the entire stack of received aerial vehicles 10, whereby the respective aerial vehicle 10 stacked uppermost in the chamber 4 can be raised at least partially above the boundary elements 3 of the chamber 4. As a result, a removal of aerial vehicles 10 is facilitated, for example. Likewise, this can facilitate a possible start directly from the transport device 2. The drive 27 for raising and lowering the lifting means 22 can be realized, for example, via a chain drive, via a rotating rod with a screw thread or via a pneumatic or hydraulic cylinder.

In a possible alternative embodiment, the lifting means 22 is integrated into the boundary elements 3 and is designed for raising or lowering the entire stack of received aerial vehicles 10 or each of the aerial vehicles 10 individually, for example via an engagement on the housing of the aerial vehicle 10, by means of the control and supply system 5 and/or the system swarm control unit 9 and a drive. The drive for raising and lowering the lifting means 22 can be realized, for example, via a chain drive, via pneumatic or hydraulic elements.

Each lifting means 22 may optionally comprise a tilting mechanism (not shown) for removing an aerial vehicle 10, wherein the control and supply system 5 and/or the system swarm control unit 9 can be designed for controlling this tilting mechanism. In the above example of the movable bottom, said bottom can simply be tilted. As a result, a removal of aerial vehicles 10 is facilitated, for example. Likewise, an aerial vehicle 10, in particular an inoperable aerial vehicle 10, can thus be removed from the lifting means 22 or from the stack of received aerial vehicles 10 in an automated fashion, that is, can be removed from the system 1. Alternatively, a wiping means for "wiping away" an aerial vehicle 10 can be configured instead of the tilting mechanism. Optionally, the control and supply system 5 or the system swarm control unit 9 accordingly changes the starting and/or landing sequence information and/or the positional information of all aerial vehicles 10 connected to the control and supply system 5.

Each lifting means 22 may optionally comprise a mechanical starting mechanism (not shown), in particular a catapult starting mechanism, with the control and supply system 5 and/or the system swarm control unit 9 being designed for controlling the starting mechanism. In this way, a possible start directly from the transport device 2 can be facilitated further.

Each lifting means 22 may optionally comprise landing means (not shown) for easier landing of the aerial vehicles 10 to be received in the chamber 4. Those landing means can be designed, for example, as a type of "air bag" around the upper opening of the chamber 4. Each aerial vehicle 10 to be landed is then caught by the landing means and returned into the chamber 4 or onto the lifting means 22. As a result, safe landing and stacking of the aerial vehicles 10 in the chambers 4 can be ensured even under severe weather conditions involving wind.

In the operating position, each lifting means 22 may optionally comprise, on its upper side, preferably controllable fixing means (not shown) for fastening the aerial vehicles 10 received in the chamber 4. As a result, the aerial vehicles 10 can be secured in particular during transport. The fixing means can also be designed so as to be electrically activatable by means of the control and supply system 5 and/or the system swarm control unit 9.

It may be mentioned that a system according to the invention can be used as a rescue system and/or a transport system, for example in the event of a catastrophe, or as an information system for sporting events such as a bicycle race or a marathon. In particular due to the advantageous logistics of the system, a large number of aerial vehicles can thereby quickly be provided in a target or disaster area in a space-saving and, consequently, cost-efficient manner.

In the context of this invention, the term unmanned aerial vehicle is to be interpreted very broadly and could also include, for example, hot air balloons, zeppelins, model planes or model helicopters.

The invention claimed is:

1. A system composed of at least two unmanned aerial vehicles, each aerial vehicle comprising a drive unit, a flight control unit operable to control the trajectory of the aerial vehicle by the drive unit and a rechargeable power cell, each aerial vehicle comprising an electrical first interface, wherein the system comprises at least one transport device with at least one chamber defined by boundary elements configured to receive the aerial vehicles stacked essentially vertically in the operating position and an electrical control and supply system operable to charge the power cells and/or to communicate with the flight control units via the first interfaces, wherein each aerial vehicle has a modular swarm control unit comprising a core module, wherein the aerial vehicles are configured by way of the core modules so as to be mechanically stackable along a stacking axis which is essentially vertical in the operating position, and wherein each core module comprises the flight control unit, the power cell, the first interface located at a lower side of the core module, and an electrical third interface which is located at an upper side of the core module opposite to the lower side along the stacking axis and is configured for electrical connection with the first interface of an aerial vehicle stacked on top of it, wherein, in a stacked and connected state of the aerial vehicles, the control and supply system is operable to charge the power cells and/or to communicate with the core modules via the first interfaces and the third interfaces.

2. A system according to claim 1, wherein the control and supply system of the transport device is operable to carry out contactless communication, by electromagnetic induction, with the first interfaces of the aerial vehicles.

3. A system according to claim 1, wherein the control and supply system of the transport device is configured for contact-bound communication by sliding contacts between at least one of the boundary elements of the chamber and the first interfaces of the aerial vehicles.

4. A system according to claim 1, wherein the control and supply system of the transport device is integrated into a ground unit of the transport device, and wherein the chamber is arranged above the ground unit in the operating position and the control and supply system is connectable to the first interface of the respective aerial vehicle stacked lowermost.

5. A system according to claim 1, wherein the transport device is configured for starting and landing the aerial vehicles, wherein the chamber is open on an upper side of the transport device in the operating position, with the control and supply system of the transport device being operable to transmit and/or change starting and/or landing sequence information and/or positional information to all/of all flight control units of the aerial vehicles connected to the control and supply system.

6. A system according to claim 5, wherein the transport device comprises a lifting means, which is movable essentially vertically, which lifting means is operable to raise the respective aerial vehicle stacked uppermost in the chamber for the starting process at least partially above the boundary elements of the chamber, with the control and supply system being operable to control the lifting means.

7. A system according to claim 6, wherein the lifting means comprises a tilting mechanism or a wiping means, wherein the tilting mechanism or the wiping means is operable to remove an inoperable aerial vehicle from the aerial vehicle located underneath or from the lifting means, with the control and supply system being operable to control the tilting mechanism or the wiping means and to change the starting and/or landing sequence information and/or the positional information to all/of all aerial vehicles connected to the control and supply system.

8. A system according to claim 6, wherein the transport device or the lifting means comprises a starting mechanism, wherein the starting mechanism is operable to mechanically bring an aerial vehicle to be started into a starting position in the airspace above the transport device, with the control and supply system being operable to control the starting mechanism.

9. A system according to claim 3, wherein the system comprises at least two transport devices and a system swarm control unit operable to control a plurality of unmanned aerial vehicles in a swarm, with the system swarm control unit being operable to communicate with the control and supply system of the individual transport devices and/or to communicate with the individual aerial vehicles via their swarm control units or via communication means of the aerial vehicles.

* * * * *